US 11,314,491 B1

United States Patent
Bailey et al.

(10) Patent No.: US 11,314,491 B1
(45) Date of Patent: Apr. 26, 2022

(54) GENERATING ASYNCHRONOUS RUNTIME COMPATIBILITY IN JAVASCRIPT APPLICATIONS

(71) Applicant: CERNER INNOVATION, INC., Kansas City, KS (US)

(72) Inventors: Douglas Bailey, Phoenixville, PA (US); Sean Emery, Royersford, PA (US); Matthew Homan, West Chester, PA (US)

(73) Assignee: CERNER INNOVATION, INC., North Kansas City, MO (US)

( * ) Notice: Subject to any disclaimer, the term of this patent is extended or adjusted under 35 U.S.C. 154(b) by 0 days.

(21) Appl. No.: 17/171,120

(22) Filed: Feb. 9, 2021

Related U.S. Application Data (63) Continuation of application No. 16/715,177, filed on Dec. 16, 2019, now Pat. No. 10,949,179, which is a continuation of application No. 15/854,133, filed on Dec. 26, 2017, now Pat. No. 10,552,128.

(51) Int. Cl.
| | | |
|---|---|---|
| G06F 9/45 | (2006.01) | |
| G06F 8/41 | (2018.01) | |
| G06F 9/38 | (2018.01) | |
| G06F 8/73 | (2018.01) | |

(52) U.S. Cl.
CPC ............ *G06F 8/427* (2013.01); *G06F 8/43* (2013.01); *G06F 8/73* (2013.01); *G06F 9/3836* (2013.01)

(58) Field of Classification Search
CPC ... G06F 8/427; G06F 8/43; G06F 8/73; G06F 9/3836

USPC ......................................................... 717/141
See application file for complete search history.

(56) References Cited

U.S. PATENT DOCUMENTS

| | | | |
|---|---|---|---|
| 5,881,272 A | * | 3/1999 | Balmer ............... G06F 9/30189 713/375 |
| 6,195,676 B1 | | 2/2001 | Spix et al. |
| 6,401,099 B1 | | 6/2002 | Koppolu et al. |
| 9,176,731 B1 | | 11/2015 | Ziftci et al. |
| 9,582,312 B1 | | 2/2017 | Karppanen |
| 10,248,187 B2 | | 4/2019 | Raghavan |
| 10,552,128 B1 | | 2/2020 | Bailey et al. |

(Continued)

OTHER PUBLICATIONS

Refactoring asynchrony in JavaScript; author: K Gallaba, published on 2017.*

(Continued)

*Primary Examiner* — Chameli Das
(74) *Attorney, Agent, or Firm* — Shook, Hardy & Bacon LLP (57) ABSTRACT

Methods and computer-readable media are disclosed herein for generating asynchronous runtime compatible applications from non-asynchronous applications. In embodiments, source code for the application that is not compatible with asynchronous processing is examined. The source code is parsed in order to identify unsafe functions that will cause failures of the application when processed in an asynchronous runtime. The source code corresponding to those unsafe functions is modified by adding asynchronous functions and commands to the source code and restructuring the source code. The modified source code may then be provided to an asynchronous runtime environment as the application is now compatible with asynchronous processing.

15 Claims, 4 Drawing Sheets

(56) References Cited

U.S. PATENT DOCUMENTS

| | | | |
|---|---|---|---|
| 2001/0052119 A1* | 12/2001 | Inaba | G06F 9/546 |
| | | | 717/160 |
| 2003/0028864 A1 | 2/2003 | Bowen | |
| 2005/0246716 A1 | 11/2005 | Smith et al. | |
| 2007/0043974 A1 | 2/2007 | Leblanc et al. | |
| 2009/0055812 A1 | 2/2009 | Smith | |
| 2009/0132991 A1* | 5/2009 | Ganai | G06F 30/3323 |
| | | | 716/104 |
| 2011/0125986 A1* | 5/2011 | Reid | G06F 9/547 |
| | | | 712/203 |
| 2011/0173600 A1 | 7/2011 | Thompson | |
| 2011/0270865 A1* | 11/2011 | Ookuma | G06F 16/93 |
| | | | 707/769 |
| 2012/0079463 A1* | 3/2012 | Freeman | G06F 8/70 |
| | | | 717/137 |
| 2012/0124585 A1* | 5/2012 | Almasi | G06F 9/522 |
| | | | 718/102 |
| 2012/0198424 A1 | 8/2012 | Kandasamy et al. | |
| 2012/0266144 A1* | 10/2012 | Halliday | G06F 11/3664 |
| | | | 717/129 |
| 2012/0324462 A1 | 12/2012 | Miljanic et al. | |
| 2014/0181838 A1* | 6/2014 | Gittelman | G06F 9/485 |
| | | | 718/107 |
| 2015/0370551 A1 | 12/2015 | Mahajan | |
| 2016/0162292 A1* | 6/2016 | Bugnion | G06F 9/3005 |
| | | | 712/245 |
| 2017/0257385 A1* | 9/2017 | Overson | H04L 63/1441 |
| 2018/0046956 A1 | 2/2018 | Marcu et al. | |
| 2018/0189115 A1 | 7/2018 | Abdallah | |
| 2018/0210709 A1 | 7/2018 | Bharthulwar | |
| 2018/0232259 A1 | 8/2018 | Chowdhury et al. | |
| 2018/0267868 A1 | 9/2018 | Bose et al. | |
| 2018/0329697 A1 | 11/2018 | Klemenz et al. | |
| 2018/0349267 A1* | 12/2018 | Toub | G06F 12/126 |

OTHER PUBLICATIONS

Modular asynchronous web programming: Advantages & challenges, autho: W Rocha et al, published on 2016.*

Title: Structured asynchrony with algebraic effects, author: D Leijen, published on 2017.*

Title: Refactoring asynchrony in JavaScript, author: K Gallaba et al. published on 2017.*

Gottschalk et al., "OBBTree: A Hierarchical Structure for Rapid Interference Detection", SIGGRAPH '96: Proceedings of the 23rd Annual Conference on Computer Graphics and Interactive Techniques, Aug. 1996, pp. 171-180.

Iyer et al., "Power and Performance Evaluation of Globally Asynchronous Locally Synchronous Processors", IEEE, INSPEC Accession No. 7336316, 2002, pp. 158-168.

Kwong, Wc. ,"Performance Comparison of Asynchronous and Synchronous Code-division Multiple-access Techniques for Fiber-optic Local Area Networks", IEEE Transactions on Communications, vol. 39, No. 11, 1991, pp. 1625-1634.

Sotillo, Susana M., "Discourse Functions and Syntactic Complexity in Synchronous and Asynchronous Communication", Language Learning & Technology vol. 4, No. 1, Available online at <http://llt.msu.edu/vol.4numl/sotillo/default.html>, 2000, pp. 77-110.

* cited by examiner

GENERATING ASYNCHRONOUS RUNTIME COMPATIBILITY IN JAVASCRIPT APPLICATIONS

CROSS REFERENCE

This patent application is a continuation of U.S. application Ser. No. 16/715,177, filed on 16 Dec. 2019 and entitled "Generating Asynchronous Runtime Compatibility in JavaScript Applications," which is a continuation of U.S. Pat. No. 10,552,128, filed on 26 Dec. 2017 and entitled "Generating Asynchronous Runtime Compatibility in JavaScript Applications," the entireties of which are each incorporated herein by reference.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods and computer-readable media for generating asynchronous runtime compatible applications from synchronous computer-programming instructions. As will be understood by a person having ordinary skill in the art reading this disclosure, synchronous computer-programming instructions are not compatible and cannot be successfully executed using asynchronous processing.

A computerized method is provided in an embodiment of the present invention. The computerized method comprises obtaining source code for an application. The method comprises parsing the source code to identify a function encoded for execution via synchronous processing and modifying the function in the source code by encoding the function for execution via asynchronous processing, in embodiments. The method stores the source code having the modified function.

Another embodiment provides one or more non-transitory computer-readable media having computer-executable instructions embodied thereon that, when executed, perform a method. The method comprises obtaining source code for an application that is not compatible with asynchronous processing. The method parses the source code to identify functions, in embodiments, and determines that a plurality of the functions rely on synchronous processing. In embodiments, the method modifies the source code corresponding to each of the plurality of functions to include one or more asynchronous functions. The modified source code is stored in a new location in a code base, wherein the modified source code is compatible with asynchronous processing.

Yet another embodiment provides one or more non-transitory computer-readable media having computer-executable instructions embodied thereon that, when executed, perform a method. The method comprises obtaining source code for an application that is not compatible with asynchronous processing and parsing the source code to identify functions. In embodiments, the method identifies a plurality of functions as unsafe functions that rely on synchronous processing, wherein the plurality of functions includes parent functions of functions that rely on synchronous processing. The method then modifies the source code corresponding to each of the plurality of unsafe functions using asynchronous functions, wherein parsing further comprises identifying parent functions of the unsafe functions. The modified source code is stored as a new version in a new location in a code base, wherein the modified source code is compatible with asynchronous processing. The method provides the modified source code to an asynchronous runtime environment for processing, in some embodiments.

BRIEF DESCRIPTION OF THE DRAWINGS

Embodiments are described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Application programming interfaces include, generally, applications run inside a webpage(s) of a web browser. Accordingly, a user could access an application by launching a web browser, proceeding to a specified address for an application, and when prompted, entering their credentials to log into the application and access the application, for example. The client could access the application through the web browser window, referred to as a parent window. The web browser window(s), generally, operated a runtime environment that executed the computer instructions of the application. In the parent window, the runtime environment processed a parent thread (i.e., a jobs in a thread in a particular sequence). In previous web browsers, the runtime environment processed only one thread at a time, which is referred to as synchronous processing. When the user interacted with the application in the parent window, by using a mouse pointer to select a button or tab, for example, the application launched a pop-up window in the web browser, referred to as child window. The child window was displayed as overlaying the parent window in the web browser and provided additional application functions to the user. Generally, a parent window has one or more 'children' that are accessed through various interactions with the application through the web browser. For example, a user could select any number of graphical user interface (GUI) objects (e.g., buttons, tabs) displayed in the parent window in order to access different functionalities of the application, provided to the user in child windows. In previous web browsers supporting synchronicity, when the child window was launched, the runtime environment stopped processing the parent thread in the parent window and passed control of the runtime environment to the child window. The runtime environment then processed a child thread in the child window. Processing of the parent thread would not be resumed until the child thread was processed and resolved.

As technology progressed, runtime environments were developed that could concurrently process multiple threads, referred to as asynchronous processing and/or parallel processing. In asynchronous processing, when a child window obtains control of the runtime environment, the parent window continues processing the parent threads (i.e., jobs a queue), unlike synchronous processing. Web browsers were developed to support asynchronous processing runtime environments while synchronous processing began to be phased out. However, the computer-programming instructions underlying many applications accessed via web browsers were written to be executed using synchronous processing. These computer-programming instructions could not successfully operate in a runtime environment using asynchronous processing.

Attempting to run an application in a webpage of a web browser using an asynchronous processing runtime environment when that application is encoded using computer-programming instructions (i.e., source code) for synchronous processing would result in a failure. At a high level, unleashing the computer-programming instructions drafted for synchronous processing in an asynchronous processing runtime environment resulted in disorganized job processing and failures. The asynchronous runtime environment concurrently processed the parent thread and the child thread, ignoring the application's computer-programming instructions specifying that jobs be executed in a particular sequence. As such, any dependencies between a parent thread and one or more child threads was disregarded and was no longer automatically enforced by the prior one-thread limit of synchronous runtime environments. The sequence for processing jobs of parent threads and child threads was jumbled and upended by parallel processing of the parent and child threads. Accordingly, applications written for web browsers that used synchronous runtime environments could not be run in webpage of web browsers that uses asynchronous processing.

The present invention addresses technological problems, such as those mentioned above, that arose due to the movement from synchronous runtime environments to asynchronous runtime environments. Additionally, the present invention provides new technological functions and improvements, such as methods for generating asynchronous runtime compatible applications from synchronous computer-programming instructions.

Figure 1:
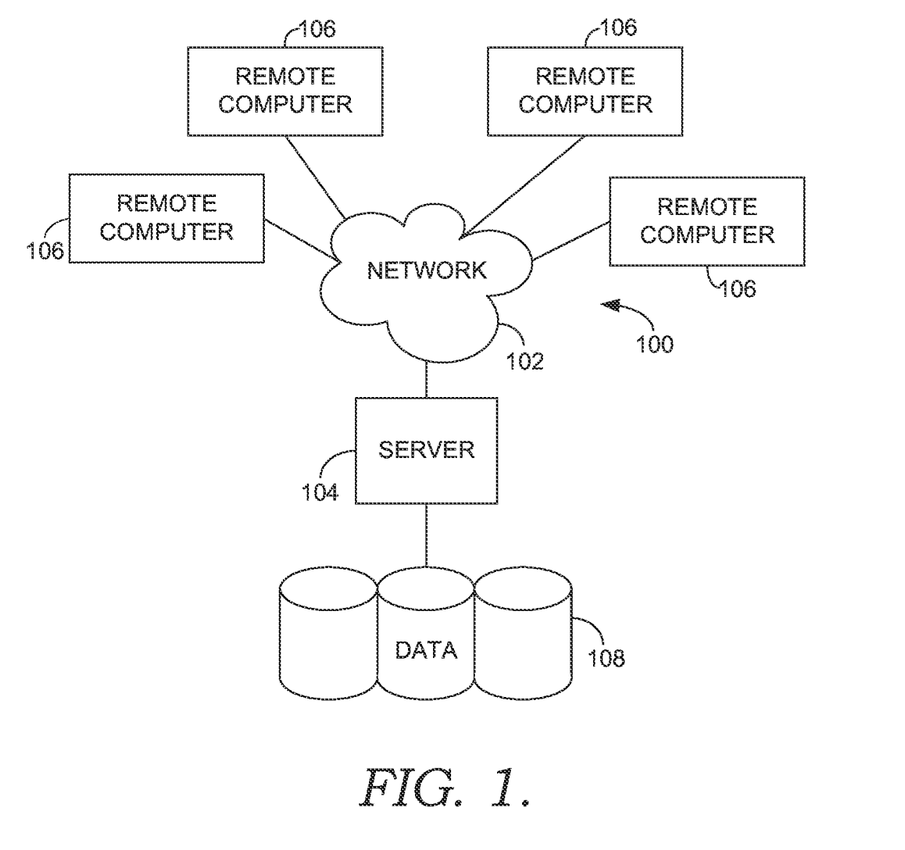
FIG. 1 is a block diagram of an exemplary environment suitable to implement embodiments of the present invention.

Beginning with FIG. 1, an exemplary computing environment is depicted, in accordance with an embodiment of the present invention. It will be understood by those of ordinary skill in the art that the exemplary computing environment 100 is just one example of a suitable computing environment and is not intended to limit the scope of use or functionality of the present invention. Similarly, the computing environment 100 should not be interpreted as imputing any dependency and/or any requirements with regard to each component and combination(s) of components illustrated in FIG. 1. It will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though devices and components are represented in FIG. 1 as singular devices and components, it will be appreciated that some embodiments may include a plurality of the devices and components such that FIG. 1 should not be considered as limiting the number of a device or component.

Continuing, the computing environment 100 of FIG. 1 is illustrated as being a distributed environment where components and devices may be remote from one another and may perform separate tasks. The components and devices may communicate with one another and may be linked to each other using a network 102. The network 102 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 102, generally, provides the components and devices access to the Internet and web-based applications.

In embodiments, the computing environment 100 comprises a computing device in the form of a server 104. Although illustrated as one component in FIG. 1, the present invention may utilize a plurality of local servers and/or remote servers in the computing environment 100. The server 104 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 104 may include or may have access to computer-readable media. Computer-readable media can be any available media that may be accessed by server 104, and includes volatile and nonvolatile media, as well as removable and non-removable media. By way of example, and not limitation, computer-readable media may include computer storage media and communication media. Computer storage media may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 104. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the server 104 uses logical connections to communicate with one or more remote computers 106 within the computing environment 100. In embodiments where the network 102 includes a wireless network, the server 104 may employ a modem to establish communications with the Internet, the server 104 may connect to the Internet using Wi-Fi or wireless access points, or the server may use a wireless network adapter to access the Internet. The server 104 engages in two-way communication with any or all of the components and devices illustrated in FIG. 1, using the network 102. Accordingly, the server 104 may send data to and receive data from the remote computers 106 over the network 102.

Although illustrated as a single device, the remote computers 106 may include multiple computing devices. In an embodiment having a distributed network, the remote computers 106 may be located at one or more different geographic locations. In an embodiment having a plurality of remote computers 106, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

Continuing, the computing environment 100 includes a data store 108. Although shown as a single component, the data store 108 may be implemented using multiple data stores that are communicatively coupled to one another, independent of the geographic or physical location of a memory device. Exemplary data stores include a code base that stores source code for one or more applications, synchronous computer-programming code patterns, asynchronous computer-programming code patterns, asynchronous functions, asynchronous commands, and the like. Generally, the data store 108 includes physical memory that is configured to store information, such as computer-programming instructions for applications, encoded in data. For example, the data store 108 may provide storage for computer-readable instructions, computer-executable instructions, data structures, data arrays, computer programs, applications, and other data that supports the functions and action to be undertaken using the computing environment 100 and components shown in exemplary FIG. 1.

In a computing environment having distributed components that are communicatively coupled via the network 102, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the server 104 may access, retrieve, communicate, receive, and update information stored in the data store 108, including program modules. Accordingly, the server 104 may execute, using a processor, computer instructions stored in the data store 108 in order to perform embodiments described herein.

In some embodiments, computing environment 100 provides the remote computers 106 with access to a web browser and a runtime environment. The runtime environment may support synchronous and/or asynchronous processing, in various embodiments. An exemplary runtime environment is a JavaScript® runtime environment. Although internal components of the devices in FIG. 1, such as the server 104, are not illustrated, those of ordinary skill in the art will appreciate that internal components and their interconnection are present in the devices of FIG. 1. Accordingly, additional details concerning the internal construction device are not disclosed herein for brevity.

Figure 2:
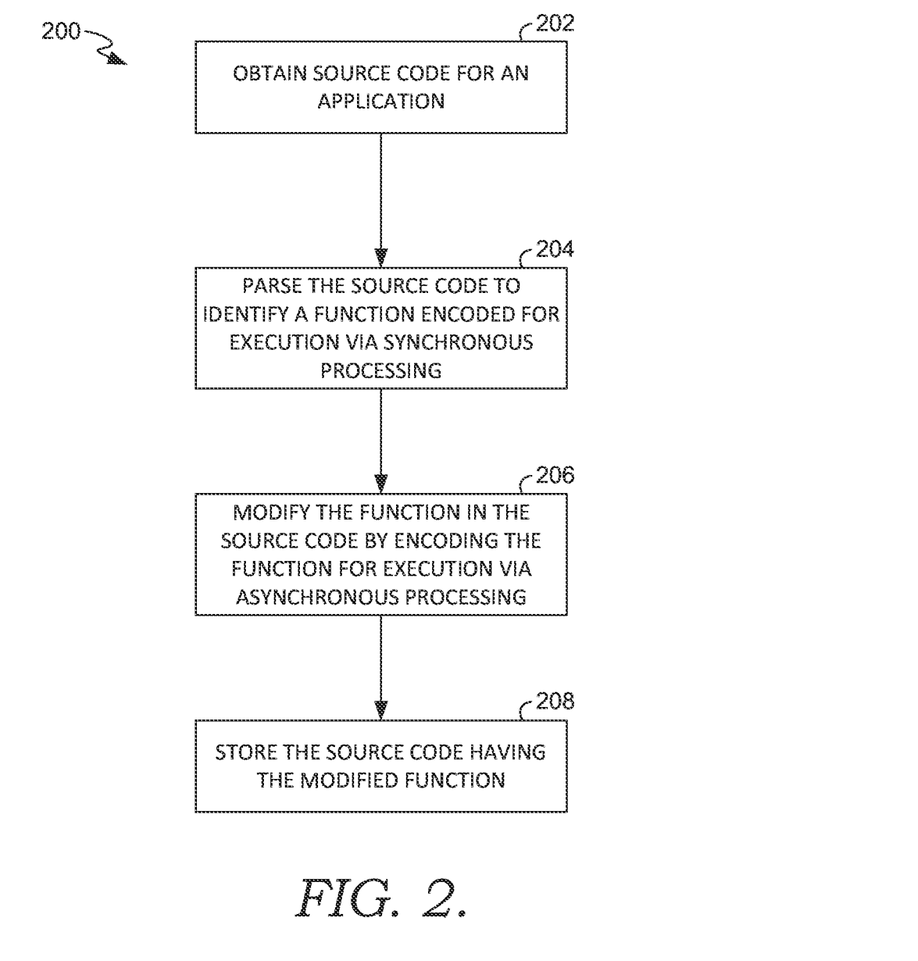
FIG. 2 is a flow diagram showing an exemplary method in accordance with an embodiment of the present invention.

Turning to FIG. 2, a flow diagram showing an exemplary method 200 is presented in accordance with an embodiment of the present invention. The method 200 obtains source code for an application at block 202. Source code refers to the computer-programming instructions for one or more applications. The terms source code and computer-programming instructions are used interchangeably herein. The source code is executable via a runtime environment to provide a user with access to the application in a web browser, for example. The source code may be identified as containing synchronous code or asynchronous code, in further embodiments. Once the source code is accessed from a code base, the method 200 can analyze the source code. In embodiments, the method 200 parses the source code to identify a function encoded for execution via synchronous processing, as shown at block 204. In embodiments, source code is parsed in order to identify functions in the computer-programming instructions. As functions are identified, the method 200 may evaluate whether each function is "safe" or "unsafe" for execution via asynchronous processing. A function refers to a unit of computer-programming instructions in the source code, wherein a function is an instruction for processing one or more particular jobs in a thread, for example. The function may further include reliance on other functions. Execution of a function corresponds to the processing or resolution of a job by the runtime environment, wherein the job supports the application. A function is unsafe when executing the function is likely to produce an error due to a deviation from a specific sequence of job processing that the function relies on. For example, a first function may require a value be returned from a second function. Thus, until the second function is executed and resolved, and the value returned as input to the first function, the first function cannot be successfully executed. Such an error is expected to occur when performing parallel processing of functions encoded for synchronous runtime environments because the synchronous compatible computer programming instructions do not account for parallel processing. In embodiments, the method 200 may determine that a function encoded for execution via synchronous processing is an unsafe function due to reliance on a specific processing sequence in a runtime environment. In embodiments, once source code has been obtained, the method 300 is performed without any user input. As such, the parsing of the source code and identifying and evaluating functions is performed automatically and without any user input.

In determining whether a function is safe or unsafe, an index of known unsafe functions may be queried during evaluation of the functions in the source code. The index of unsafe functions may be used to identify functions by their name throughout the source code and marked those functions as unsafe so that the mark functions may then be rewritten for asynchronous compatibility. In embodiments, the method 200 may update the index of unsafe functions by adding newly recognized unsafe functions to the index. The index of unsafe functions may be consulted when performing the method 200 with respect to other applications and their source code. As such, the index of unsafe functions may be 'reused' and applied to multiple different applications to rewrite source code and create asynchronous compatibility.

At block 206, the method 200 modifies the function in the source code by encoding the function for execution via asynchronous processing. In accordance with the method 200, the source code associated with the unsafe function/the function encoded for execution via synchronous processing is rewritten or re-encoded. The method 200 continues by rewriting at least a portion of the source code of the application. In embodiments, rewriting portions of the source code does not require any user input. The rewriting or re-encoding of the source code is performed automatically by a custom-built transpiler, for example.

In embodiments, one or more unsafe functions are rewritten using asynchronous functions, as explained in further detail hereinafter. In one embodiment, all of the unsafe functions in the source code of the application are rewritten by adding asynchronous functions and commands, and restructuring the code into an asynchronous code structure. In some embodiments, unsafe functions in the source code are actually overwritten in the memory storing the original source code. Although a command is technically not a function in JavaScript®, the term "asynchronous function" is used herein to refer to both asynchronous functions and commands, for simplicity. In other embodiments, a copy of the source code is modified, thereby creating a new version of the source code that is compatible with asynchronous processing while maintaining the original source code for synchronous processing in legacy web browsers.

At block 208, the method 200 stores the source code having the modified function. In further embodiments, the method 200 may store the source code, as unmodified, in a code base using a first path while storing the source code having the modified functions in the code base using a second path that is not the same as the first path. In such an embodiment, the method 200 may provide the source code, as unmodified, to a synchronous runtime environment via the first path and provide the source code having the modified function to an asynchronous runtime environment via the second path. The source code having modified functions is now compatible with asynchronous processing and the application may be successful run in a web browser that utilizes an asynchronous runtime environment. When the modified source code for the application is executed in an asynchronous runtime environment of a webpage of a web browser, the application is successful.

The modified source code does not operate in an asynchronous manner—it only has the appearance of synchronous execution based on the modifications to the source code. In one embodiment, asynchronous JavaScript® functions and commands are used when rewriting the initially synchronous source code. Exemplary JavaScript® functions include callback and async functions. Exemplary JavaScript® commands include the await command. Generally, a function may be invoked using a keyword. A command is used to alter or modify the execution of a function. For example, a callback function encoded in computer-programming instructions is used to determine job queue execution order. For example, a call back function may be used to indicate that a particular job in a thread, for example, is not be executed until another job in the thread has been previously executed. Thus, the callback function is applied to a called function to render processing of the called function dependent on the processing of an antecedent function, such that the runtime environment does not process the called function until the antecedent function has been processed. The callback function is generally used to designate a job sequence for executing various functions in the runtime environment, but this forms a convoluted and unwieldy callback chain with multiple function dependencies.

In embodiments of the present invention, unwieldy callback chains are avoided by modifying or rewriting the source code using the async function and the await command. Modifying the source code with the async function and the await command provide an elegant coding solution to unwieldy callback chains. An example of the await/aysnc solution is shown below, as further discussed below:

```
async function myShowDialog( ){
returnVal=await showModalDialog( );
console.log(returnVal);
}
```

The await command instructs the runtime environment to wait until a called function completes its execution. Using the await command, the runtime environment does not continue to the next statement in the computer-programming instructions. When the called function completes its execution, the await command is satisfied or otherwise resolved and the runtime environment proceeds to execution of the next statement in the computer-programming instructions. In the exemplary modified source code illustrated above, the await command instructs the runtime environment to wait until the called function showModalDialog executes to completion. In this way, the asynchronous runtime environment does not advance to the next statement in the source code until the called function showModalDialog is executed to completion (e.g., a value is returned), based on the await command.

The modified source code also includes the async function in tandem with the await operation to avoid convoluted callback chains. In the exemplary modified source code illustrated above, the async function has the option of halting execution when the async function is executed with an await command. In such a scenario, the async function halts or holds execution until all await commands in the statement are resolved. Thus, the async function halts execution of the called function myShowDialog until the await command is satisfied by the complete execution of the called function showModalDialog, and the await command prevents the asynchronous runtime environment from continuing to the next computer-programming statement until a value is returned for the called function showModalDialog. Accordingly, the synchronous computer-programming instructions have been rewritten to run in an asynchronous environment. Together, the await command and the async functions are used to rewrite the source code and create a processing sequence for jobs in a thread in the asynchronous runtime environment.

In embodiments of the present invention, callback function is added to the source code in addition to the await command and the async function. An example of the await/async solution incorporating a callback function is shown below, and discussed below:

```
async function showModalDialog(modalUrl) {
    var done=false;
    var returnCode;
    callJQueryDialogWithCallback(modalUrl, async function (rc) {
        returncode=rc;
        done=true;
    });
    while (!done) {
        await new Promise(function (resolve, reject) {
            setTimeout(resolve, 0);
        });
    }
    return returnCode;
}
```

In the exemplary modified source code illustrated above, a callback function is used with the async function and the await command when rewriting synchronous computer-programming instructions to run in an asynchronous environment. As explained above, the await command prevents the asynchronous runtime from advancing to the next job in a thread/statement in the source code until the function associated with the await command is executed to completion. In the example, the await command halts or holds execution so that the asynchronous runtime does not advance to the next statement in the computer-programming instruction until the function is executed to completion. Additionally, the async function, invoked with the await command, halts execution of a called function until all await commands are satisfied. In the example above, the async function halts execution until the await command is satisfied such that the asynchronous runtime environment does not execute the function showModalDialog until the await command is satisfied by the completion of the called function. A call back function, callJQueryDialogWithCallBack, has been added to the source code in the example. Notably, the call back function is dependent on the async function, meaning that the asynchronous runtime environment does not process the callback function until the async function is satisfied (and all await commands therein). By nesting the await command and the callback function within the async function and rendering the callback function dependent on the async function, the asynchronous runtime environment can be held in an infinite processing loop until the jobs in the thread are processed in a particular sequence. As such, the modified source code is being executed in an asynchronous runtime environment but in a controlled execution sequence. Using the async and await commands with the callback function to rewrite the source code, as shown above, results in the source code being compatible with an asynchronous runtime environment and overcomes the problems of convoluted and unwieldy callback chains with multiple function dependencies.

The infinite processing loop, however, is not a 'tight loop.' The setTimeout function, shown in the exemplary modified source code enables multiple processing loops to concurrently run in the asynchronous runtime environment, unlike a tight loop. Because multiple processing loops are allowable using the setTimeout function, for example, child functions still receive processing power while a parent function is being held in a processing loop. In embodiments, unsafe functions are modified with the await command, the sync function, and the setTimeout function to generate the loop discussed above, and render the functions, as modified in the source code, to be compatible and executable via asynchronous processing. In accordance with the methods discussed herein, modifying synchronous functions in the source code includes rewriting or encoding that function using the asynchronous functions and commands discussed above, including the setTimeout function.

Accordingly, automatically modifying each of the unsafe functions in the source code of an application by re-encoding the unsafe functions using the async function, the await command, and the callback function, as discussed above, results in a sequence controlled processing of functions in an asynchronous environment and this prevents failure of the application. It will be understood from this disclosure that the exemplary code shown above are not limiting. The methods discussed herein may be used and applied to any number of functions and applications.

Figure 3:
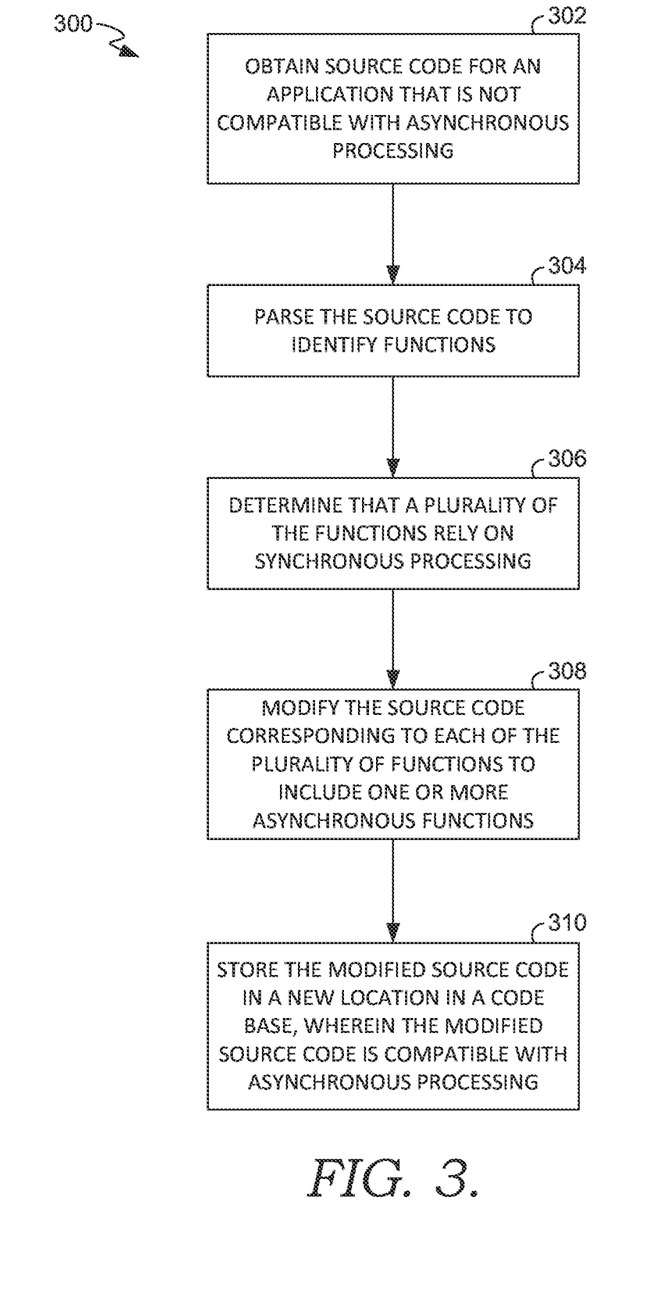
FIG. 3 is a flow diagram showing an exemplary method in accordance with an embodiment of the present invention.

FIG. 3 provides a flow diagram showing an exemplary method 300 in accordance with an embodiment of the present invention. In embodiments, the method 300 is performed using one or more non-transitory computer-readable media having computer-executable instructions embodied thereon that, when executed, perform the method 300. At block 302, the method 300 obtains source code for an application that is not compatible with asynchronous processing. At block 304, the method 300 parses the source code to identify functions. In some embodiments, the method 300 parses the source code into syntax trees. A syntax tree or a set of syntax trees provide(s) a representation of the functions in the source code, the nodes of the trees corresponding to functions and the branches or hierarchy of the tree representing relationships and dependencies between various functions in the source code. As such, the syntax tree includes child nodes, parent nodes, parent of parent nodes, and so one, for example, until all functions in the source code have been accounted for in the syntax trees. As explained previously, a parent function depends on the executing child functions to completion in order for the parent function to resolve. The nodes in the syntax tree are used to represent these dependencies between functions in the source code.

In an embodiment, the syntax trees are abstract syntax trees (ASTs). Abstract syntax trees may be searched for call expression nodes, for example. Call expression nodes correspond to function calls. The source code for unsafe functions may then be re-encoded using asynchronous functions and the modification of the source code may be performed in the syntax tree itself, before the syntax tree is decompiled, for example. In some embodiments, an identifier or name of particular unsafe functions may be check against the identified call expression nodes, using an index of unsafe functions.

At block 306, the method 300 determines that a plurality of the functions rely on synchronous processing. In embodiments, determining that one or more of the plurality of functions rely on synchronous processing comprises, for each of the plurality of functions, identifying a name of the function, and querying an index of unsafe functions using the name of the function. When the name of the function is present in the index of unsafe function, the method 300 continues by proceeding to modify the function for asynchronous compatibility.

In some embodiments, when the method determines that a function relies on synchronous processing, the method 300 also identifies any parent functions for that function. In such an example, the parent function inherently relies on synchronous processing of the child thread, at least partially. The parent function is marked as an unsafe function that relies on synchronous processing in such an embodiment. The method continues by performing an iterative search for functions, parent functions, parents of parents, parents of parents of parents, etc. The method searches for and identifies all parents (e.g., to the nth degree), until every function in the source code has been analyzed. An iterative search is applied to the source code in order to insure that every single unsafe function (e.g., functions that reply on synchronous execution, functions that are dependent on (parents of) functions that rely on synchronous execution) is identified.

At block 308, the method 300 modifies the source code corresponding to each of the plurality of functions to include one or more asynchronous functions. If a parent function has been identified, the method 300 also modifies the source code corresponding to the parent function using one or more asynchronous functions. In an embodiment that parses the source code into syntax trees, each of the syntax trees is modified by removing portions of the source code corresponding to the plurality of functions determined to rely on synchronous processing and/or by encoding one or more asynchronous functions into the source code for the plurality of functions. In some embodiments, the asynchronous functions encoded into the plurality of functions being modified include an async function and an await command. In various embodiments, modifications including writing or encoding a combination of asynchronous functions, such as an async function, an await command, and/or a callback functions, into the source code for each of the functions being modified. In embodiments that parse the source code into syntax trees, the method 300 decompiles the syntax trees, as modified, into a new version of the source code. At block 310, the method 300 stores the modified source code in a new location in a code base, wherein the modified source code is compatible with asynchronous processing.

Figure 4:
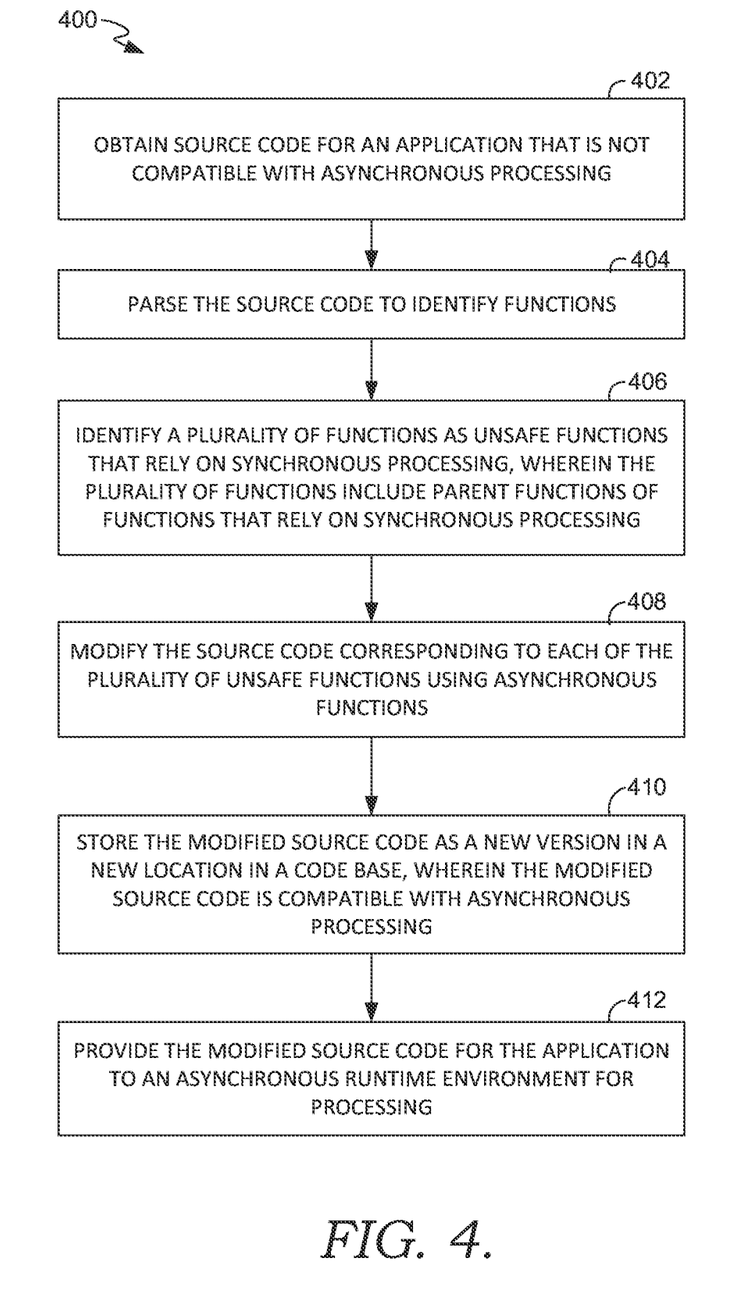
FIG. 4 is a flow diagram showing an exemplary method for in accordance with an embodiment of the present invention.

In FIG. 4, a flow diagram illustrates an exemplary method 400 in accordance with an embodiment of the present invention. In embodiments, the method 400 is performed using one or more non-transitory computer-readable media having computer-executable instructions embodied thereon that, when executed, perform the method 400. At block 402, the method 400 obtains source code for an application that is not compatible with asynchronous processing. At block 404, the method 400 parses the source code to identify functions, as previously described hereinabove. At block 406, the method 400 identifies a plurality of functions as unsafe functions that rely on synchronous processing, wherein the plurality of functions include parent functions of functions that rely on synchronous processing. In embodiments, parsing the source code further comprises identifying parent functions of the unsafe functions. At block 408, the method 400 modifies the source code corresponding to each of the plurality of unsafe functions using asynchronous functions. The asynchronous functions include an async function and an await command, in embodiments. Although the await function is a command and technically not a function in JavaScript®, the term "asynchronous function" is used herein to refer to asynchronous functions and commands, for simplicity. In further embodiments, the asynchronous functions also include a callback function. At block 410, the method 400 stores the modified source code as a new version in a new location in a code base, wherein the modified source code is compatible with asynchronous processing.

At block 412, the method provides the modified source code for the application to an asynchronous runtime environment for processing. In further embodiments, the method 400 continues by executing the modified source code for the application using an asynchronous runtime environment. When the modified source code for the application is executed using an asynchronous runtime environment, the async function halts execution of processing until all underlying await commands are processed and resolved, while the await command waits until a value is returned for an underlying function. In a further embodiment, a callback function is not executed until an underlying async function is executed. As such, the async, await, and callback functions work together to control the sequence of processing in the asynchronous runtime environment.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A computerized method for automatically modifying computer-programming instructions to change or control one or more execution sequences, the method comprising:
   identifying, via a processing, a processing instruction in computer- programming instructions that are stored in a code base;
   determining, by the processor, that at least one of the processing instruction or the computer-programming instructions is associated with non-parallel processing; and
   in response to determining that the at least one of the processing instruction in the computer-programming instructions is associated with non-parallel processing, automatically rewriting, by a transpiler, at least a portion of the computer-programming instructions by adding, within the portion of the computer- programming instructions, each of an async processing instruction, an await processing instruction, and a callback processing instruction, wherein at least the portion of the computer-programming instructions as rewritten is associated with parallel processing.

2. The method of claim 1, wherein automatically rewriting, by the transpiler, the at least the portion of the computer-programming instructions comprises:
   restructuring the computer-programming instructions into a structure that is compatible with parallel processing.

3. The method of claim 1, wherein automatically rewriting, by the transpiler, the at least the portion of the computer-programming instructions comprises:
   overwriting the processing instruction identified with a new processing instruction that is compatible with parallel processing.

4. The method of claim 1, wherein automatically rewriting, by the transpiler, the at least the portion of the computer-programming instructions comprises:
   deleting the processing instruction identified.

5. The method of claim 1, wherein automatically rewriting, by the transpiler, the at least the portion of the computer-programming instructions comprises:
   inserting an asynchronous processing instruction into the computer-programming instructions, wherein the asynchronous processing instruction modifies the processing instruction identified to become compatible with parallel processing.

6. One or more non-transitory computer-readable media having computer-executable instructions embodied thereon that, when executed, perform a method for automatically modifying computer-programming instructions to change or control one or more execution sequences, the media comprising:

identifying, via a processing, a processing instruction in computer-programming instructions that are stored in a code base;

determining, by the processor, that at least one of the processing instruction in the computer-programming instructions is associated with non-parallel processing; and in response to determining that the at least one of the processing instruction or the computer-programming instructions is associated with non-parallel processing, automatically rewriting, by a transpiler, at least a portion of the computer-programming instructions by adding, within the portion of the computer-programming instructions, each of an async processing instruction, an await processing instruction, and a callback processing instruction, wherein at least the portion of the computer-programming instructions as rewritten is associated with parallel processing.

7. The media of claim 6, wherein automatically rewriting, by the transpiler, the at least the portion of the computer-programming instructions comprises:

restructuring the computer-programming instructions into a structure that is compatible with parallel processing.

8. The media of claim 6, wherein automatically rewriting, by the transpiler, the at least the portion of the computer-programming instructions comprises:

overwriting the processing instruction identified with a new processing instruction that is compatible with parallel processing.

9. The media of claim 6, wherein automatically rewriting, by the transpiler, the at least the portion of the computer-programming instructions comprises:

deleting the processing instruction identified.

10. The media of claim 6, wherein automatically rewriting, by the transpiler, the at least the portion of the computer-programming instructions comprises:

inserting an asynchronous processing instruction into the computer-programming instructions, wherein the asynchronous processing instruction modifies the processing instruction identified to become compatible with parallel processing.

11. A system for automatically modifying computer-programming instructions to change or control one or more execution sequences, the system comprising:

one or more processors that:

identify a processing instruction in computer-programming instructions that are stored in a code base;

determine that at least one of the processing instruction in the computer-programming instructions is associated with non-parallel processing; and in response to determining that at least one of the processing instruction or the computer-programming instructions is associated with non-parallel processing, automatically rewrite, via a transpiler, at least a portion of the computer-programming instructions by adding, within the portion of the computer-programming instructions, each of an async processing instruction, an await processing instruction, and a callback processing instruction, wherein at least the portion of the computer-programming instructions as rewritten is associated with parallel processing.

12. The system of claim 11, wherein the one or more processors automatically rewrite, via the transpiler, the at least the portion of the computer-programming instructions by:

restructuring the computer-programming instructions into a structure that is compatible with parallel processing.

13. The system of claim 11, wherein the one or more processors automatically rewrite, via the transpiler, the at least the portion of the computer-programming instructions by:

overwriting the processing instruction identified with a new processing instruction that is compatible with parallel processing.

14. The system of claim 11, wherein the one or more processors automatically rewrite, via the transpiler, the at least the portion of the computer-programming instructions by:

deleting the processing instruction identified.

15. The system of claim 11, wherein the one or more processors automatically rewrite, via the transpiler, the at least the portion of the computer-programming instructions by:

inserting an asynchronous processing instruction into the computer-programming instructions, wherein the asynchronous processing instruction modifies the processing instruction identified to become compatible with parallel processing.

* * * * *